United States Patent [19]

Baba

[11] Patent Number: 4,599,796
[45] Date of Patent: Jul. 15, 1986

[54] CUTTER BLADE DEVICE OF MOWING MACHINE

[75] Inventor: Toru Baba, Yokosuka, Japan

[73] Assignee: Kioritz Corporation, Tokyo, Japan

[21] Appl. No.: 720,689

[22] Filed: Apr. 8, 1985

[30] Foreign Application Priority Data

Apr. 20, 1984 [JP] Japan .............................. 59-58320[U]

[51] Int. Cl.⁴ ................................................ A01D 50/00
[52] U.S. Cl. ........................................ 30/276; 30/347
[58] Field of Search .................... 30/276, 347; 56/12.7

[56] References Cited

U.S. PATENT DOCUMENTS

| | | | |
|---|---|---|---|
| 4,244,103 | 1/1981 | Snarr | 30/276 |
| 4,254,550 | 3/1981 | Satoh | 30/276 |
| 4,310,970 | 1/1982 | Evenson et al. | 30/276 |
| 4,335,510 | 6/1982 | Close et al. | 30/276 |
| 4,476,632 | 10/1984 | Proulx | 30/276 |
| 4,483,069 | 11/1984 | Moore | 30/276 |
| 4,490,910 | 1/1985 | Mattson et al. | 30/276 |
| 4,557,052 | 12/1985 | Baba et al. | 30/276 |

Primary Examiner—Jimmy C. Peters
Attorney, Agent, or Firm—Sheridan Neimark

[57] ABSTRACT

A cutter blade device of a mowing machine including a casing, and an inertia shifter has at least one pawl member formed at one of the inertia shifter and casing, and at least one receiving portion formed at the other of the inertia shifter and casing. The pawl member is engageable with the receiving portion to restrict a rearward movement of the inertia shifter with respect to the rotary casing.

1 Claim, 4 Drawing Figures

CUTTER BLADE DEVICE OF MOWING MACHINE

BACKGROUND OF THE INVENTION

This invention relates to cutter blade devices of mowing machines in general, and more particularly it is concerned with a cutter device of a mowing machine of the cord cutter type provided with a semiautomatic inertia shifter for suitably paying out flexible cords in a predetermined length from a rotary casing in which they are held in a coiled condition to outside.

Generally, when a mowing machine of the cutter blade type using nylon cords or other flexible cords as cutter blades is put to use, free end portions of the cords serving as cutter blades are payed out in a suitable length from the rotary casing in which they are held in a coiled condition. When the free end portions of the cords payed out from the rotary casing and used as cutter blades are worn or broken with use, it is necessary to uncoil the cords held in the rotary casing and pay out them from the casing to replenish the cutter blades. To this end, there is provided an inertia shifter for semiautomatically performing the operation of paying out the cords from the casing. The inertia shifter is usually mounted in the rotary casing substantially concentrically therewith for sliding movement both axially and peripherally of the casing. While the casing is rotated, a projection formed at least on one of upper and lower surfaces of the inertia shifter is brought into engagement with one of a plurality of protuberances formed at the casing and disposed anterior to the shifter with respect to the direction of rotation of the casing and spaced apart a suitable distance from each other peripherally of the casing, to lock the shifter in place. Meanwhile, the free end portions of the cords held in the rotary casing in a coiled condition are payed out from the casing to outside through apertures formed in the inertia shifter. In the cutter blade device of the construction described hereinabove, when it is desired to pay the cords out of the casing, the operator only has to give a shake to the casing in the axial direction while keeping it in a rotating condition. The shake will release the projection of the shifter from engagement with one of the protuberances on the casing, so that centrifugal forces acting on the cords will move the shifter forwardly with respect to the casing into engagement with the next following protuberance on the casing. Thus, the cords in the casing are payed out therefrom in a length corresponding to the distance covered by the movement of the shifter.

In the cutter blade device of the aforesaid construction of the prior art, when a mowing operation is performed by using the portions (free end portions) of the cords payed out from the casing as cutter blades, the free end portions of the cord strike the grass, for example, and produce a reaction which would cause the shifter to move rearwardly together with the free end portions of the cords, so that the shifter would oscillate between the protuberances on the casing. If the length of the free end portions of the cords extending out of the casing is smaller than the length of the cords payed out of the casing by the oscillating movement of the shifter, the free end portions of the cords would be released from the apertures formed in the shifter when the casing stops rotating and drawn into the casing. When this phenomenon occurred, it would be necessary to disassemble the casing and draw the free end portions of the cords through the apertures in the shifter to start a mowing operation again.

SUMMARY OF THE INVENTION

This invention has been developed for the purpose of obviating the aforesaid disadvantage of the prior art. Accordingly, the invention has as its object the provision of a cutter blade of a mowing machine provided with means capable of limiting with a simple construction the range of oscillatory movements of the inertia shifter to an essential minimum to prevent the cords from being inadvertently drawn back into the casing.

According to the invention, there is provided a cutter blade device of a mowing machine comprising a rotary casing, flexible cords held in the rotary casing in coiled form, and an inertia shifter formed with apertures for paying out free end portions of the cords therethrough from the rotary casing to outside, said inertia shifter being arranged in the rotary casing for sliding movement both axially and peripherally of the rotary casing and capable of being brought into and out of locking engagement with the rotary casing in a position anterior to the shifter with respect to the direction of rotation of the rotary casing, wherein the improvement comprises at least one pawl member provided to one of the inertia shifter and the rotary casing and operable in a direction opposite to the direction of rotation of the rotary casing, and at least one receiving portion provided to the other of the inertia shifter and rotary casing and operative to come into engagement with the pawl member.

By virtue of the constituent feature of the invention of the aforesaid construction, the engagement of the pawl member with the respective receiving portion during rotation of the casing restricts the movement of the inertia shifter more than is necessary. Thus, the disadvantage of the prior art that the shifter inevitably moves rearwardly a distance greater than is necessary due to a reaction produced when the free end portions of the cords strike some hard object can be obviated, thereby preventing the free end portions of the cords from being with drawn into the casing.

BRIEF DESCRIPTION OF THE DRAWINGS

FIG. 4 is a sectional view of the cutter blade device taken along a plane different from the plane along which FIG. 3 is taken.

DESCRIPTION OF THE PREFERRED EMBODIMENT

The invention will now be described by referring to a preferred embodiment shown in the accompanying drawings.

Figure 1:
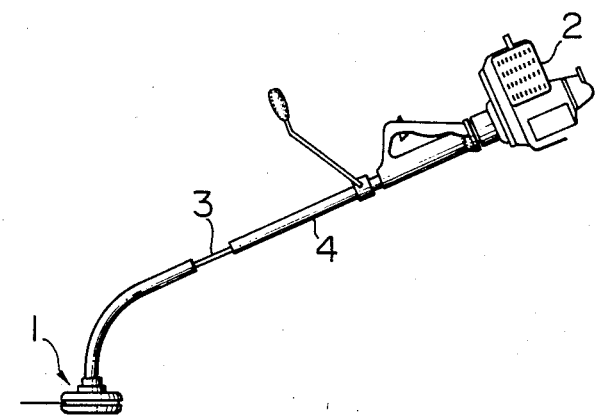
FIG. 1 is a side view of a mowimg machine having a cutter blade device incorporated therein.

Referring to FIG. 1, the numeral 1 designates a cutter blade device incorporated in a mowing machine which comprises a small internal combustion engine 2 for driving the cutter blade device 1, and a drive shaft 3 extending through a hollow operating rod 4 for transmitting motive force from the internal combustion engine 2 to the cutter blade device 1.

Figure 2:
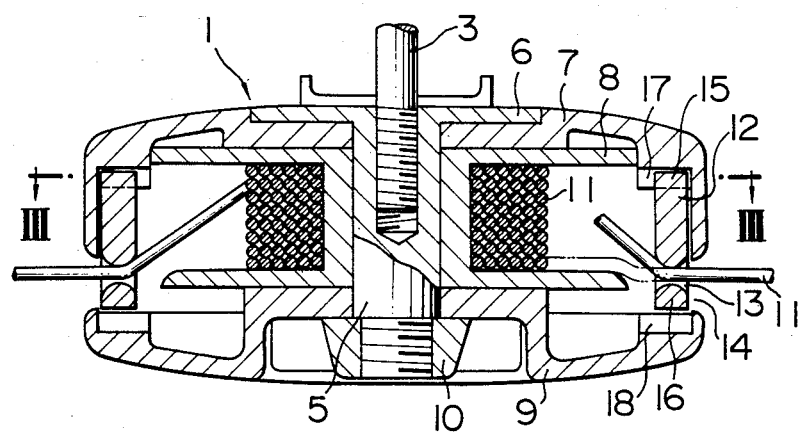
FIG. 2 is a vertical sectional view of the cutter blade device comprising one embodiment of the invention.

Referring to FIG. 2, the cutter blade device 1 comprises a shaft portion 5 threadably connected to a lower end of the drive shaft 3 and formed with a flange 6 at its upper end. A downwardly facing upper casing member 7 of bowl shape, a spool 8 and an upwardly facing lower casing member 9 of bowl shape are successively fitted from below to a shaft portion of the shaft member 5 in the indicated order, and a clamp nut 10 is threadably fitted over a threaded portion of the shaft member 5 sticking downwardly outwardly of the lower casing member 9, to clamp the lower casing member 9, spool 8 and upper casing member 7 together against the flange 6 of the shaft portion 5. Thus, the upper and lower casing members 7 and 9, which constitute a casing, and the spool 8 are formed into an assembly which rotates together with the drive shaft 3.

Two cords 11 formed of flexible material, such as nylon cords, are coiled on a groove portion of the spool 8 defined between upper and lower flanges. The cords 11 which are wound on the spool 8 in a direction opposite the direction in which the casing 7, 9 rotates or the direction of rotation A of the drive shaft 3 (see FIG. 3) each include a free end portion of a predetermined length extending from inside the casing 7, 9 to outside through one of apertures 13 formed in an inertia shifter 12 constructed as presently to be described. To enable the free end portions of the cords 11 to be drawn out through the apertures 13, the upper casing member 7 and lower casing member 9 define between opposing ends of their peripheral walls an annular gap 14 extending throughout the circumference of the casing 7, 9.

The inertia shifter 12 is located in the casing 7, 9 substantially concentrically therewith in a position disposed inwardly of peripheral walls of the casing members 7 and 9. The inertia shifter 12 thus positioned is slidable axially of the casing 7, 9 or vertically in FIG. 2 and peripherally of the casing 7, 9. The inertia shifter 12 is annular in shape in this embodiment. However, the invention is not limited to this specific form of inertia shifter 12 and the inertia shifter 12 may be of any form as desired. The inertia shifter 12 is formed with two apertures 13 located in diametrically opposed positions which are lower than an inner surface of the lower flange of the spool 8. By this arrangement, the cords 11 coiled on the spool 8 have their free end portions drawn out in a downwardly bent condition as shown by broken lines through the apertures 13 as shown in FIG. 2. During mowing operations, centrifugal forces exerted on the free end portions of the cords 11 as the casing 7, 9 rotates produce a force which acts in a manner to stretch the cords 11. As a result, force is applied to the inertia shifter 12 to bias same upwardly. The invention is not limited to the aforesaid means for biasing the inertia shifter 12 upwardly, and any other suitable means may be used instead.

Meanwhile, the inertia shifter 12 is formed at its top surface and bottom surface with a plurality of engaging projections 15 and 16, respectively, as shown in FIG. 2 which are equidistantly spaced apart peripherally of the shifter 12 while the engaging projections 15 at the top surface and the engaging projections 16 at the bottom surface are vertically aligned with each other. A plurality of protuberances 17 and 18 corresponding to the engaging projections 15 and 16 are formed on inner peripheral surfaces of the casing members 7 and 9, respectively, which are substantially equidistantly spaced apart from each other. The protuberances 17 and 18 are shown as being out of phase with each other (see FIG. 3), but this is not restrictive and they may be in the same phase. The engaging projections 15 and 16 at the top and bottom surfaces of the shifter 12, respectively, may be one in number, not plural.

Figure 3:
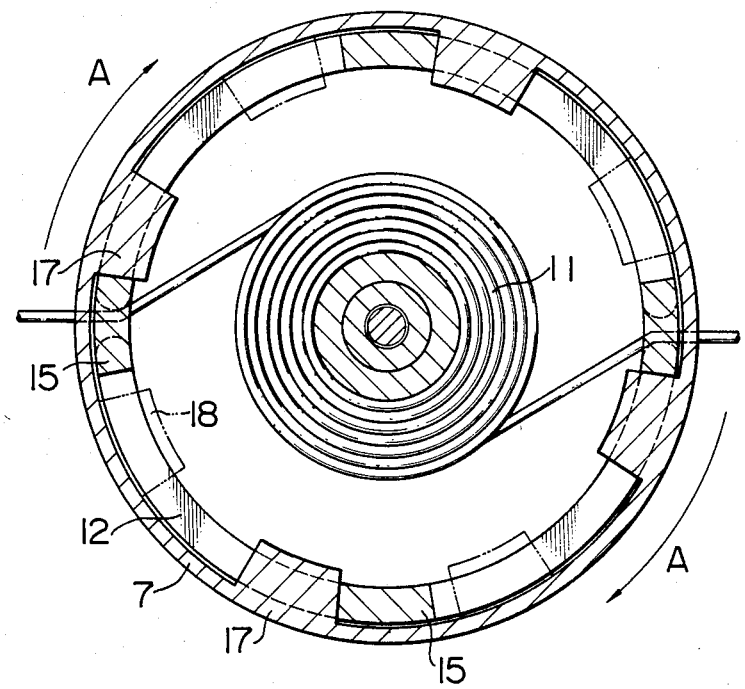
FIG. 3 is a sectional view taken along the lines III—III in FIG. 2.

When a mowing operation is performed by the mowing machine having the cutter blade device of the aforesaid construction, the casing members 7 and 9 rotate in the direction of an arrow A in FIG. 3 together with the drive shaft 3, and the free end portions of the cords 11 drawn out from the casing 7, 9 to outside are converted into a rod form by centrifugal forces and cut grass. At this time, the inertia shifter 12 is urged to move upwardly as viewed in FIG. 2 and at the same time accelerated in its rotation in the direction of the arrow A by the centrifugal forces acting on the cords 11 as described hereinabove, with a result that a leading end of each engaging projection 15 at the top surface of the shifter 12 is brought into engagment with a trailing end of the corresponding protuberance 17 on the upper casing member 7 with respect to the direction A of rotation as the former is forced against the latter to thereby prevent the cords 11 from being drawn out from the casing 7, 9 in a length greater than the predetermined one.

When the free end portions of the cords 11 are damaged or broken from wear and it is desired to pay out additional portions of the cords 11 from the casing 7, 9, the operator gives a shake to the cutter blade device 1 vertically as viewed in FIG. 2. This causes the inertia shifter 12 to temporarily move downwardly as the engaging projections 15 at the top surface thereof are brought out of engagement with the protuberances 17 on the upper casing member 7, allowing the inertia shifter 12 to shift freely in a circumferential direction. At this time, owing to the centrifugal forces acting on the cords 11, the inertia shifter 12 is rotating at a velocity higher than the velocity at which the casing 7, 9 is rotating, so that the inertia shifter 12 shifts forwardly relative to the casing 7, 9 and moves upwardly until the engaging projections 15 are each brought into engagement with one of the next following protuberances 17 on the upper casing member 7. As the inertia shifter 12 shifts forwardly as described hereinabove, the cords 11 coiled on the spool 8 are payed out and drawn out from the casing 7, 9 to outside through the apertures 13 in a length corresponding to the distance covered by the forward shifting of the inertia shifter 12. The provision of the engaging projections 15 and 16 disposed at the top and bottom sides, respectively, of the inertia shifter 12 which are out of phase with each other as shown in FIG. 3 offers the advantage that the drawing of the cords 11 from the casing 7, 9 is positively effected because one half the length of the cords 11 desired to be drawn out is payed out of the spool 8 during the upward movement of the inertia shifter 12 and the other half is payed out during the downward movement thereof. However, the projections 16 and the protuberances 18 disposed in the lower positions may be eliminated.

Figure 4:
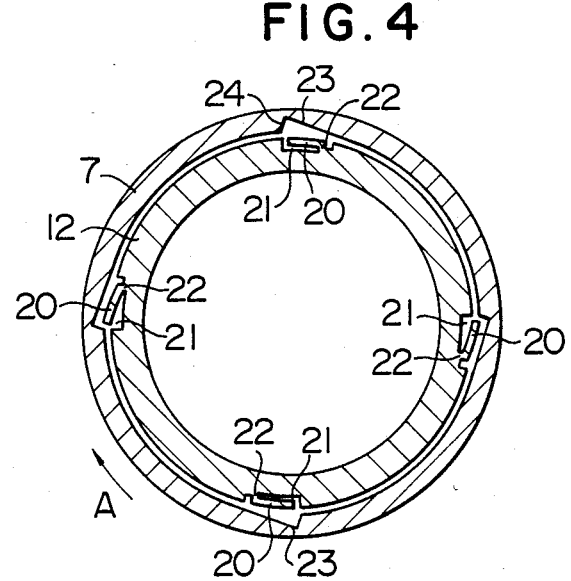

During mowing operations, the cords 11 might strike a hard object with a force of high intensity, or the velocity at which the casing 7, 9 rotates might be reduced, resulting in the centrifugal forces acting on the cords 11 being decreased in intensity. When any one of these phenomena occurs, the inertia shifter 12 would oscillate back and forth with respect to the direction of rotation of the casing 7, 9. If such oscillatory movement were high in magnitude, there might be the risk that the free end portions of the cords 11 would be pulled back into the casing 7, 9. To avoid this trouble, pawl means is provided for regulating the magnitude of such oscillatory movement, particularly a rearward movement. FIG. 4 shows the casing member 7 and shifter 12 in a cross section in a plane different from the cross section in which they are shown in FIG. 3. In the embodiment shown and described hereinabove, the inertia shifter 12 is formed of a synthetic resinous material, such as nylon, and has a plurality of pawl members 20 located at its outer peripheral surface and peripherally spaced apart substantially equidistantly from each other. In the illustrated constructional form, each pawl member 20 is in the form of a strip of a substantial height extending vertically from the plane of FIG. 4. In the illustrated constructional form, the pawl members 20 are equal in number to the projections 15 (16), but this is not restrictive and they may differ from the projections 15 (16) in number. Each pawl member 20 is pivotably connected to the outer peripheral surface of the inertia shifter 12 at an end thereof which is disposed anterior to an opposite end thereof with respect to the direction of rotation A, so that it is disposed in a recess 21 formed at the outer peripheral surface of the inertia shifter 12 when the latter remains stationary or moves forwardly and opened radially outwardly of the shifter 12 by centrifugal forces when the shifter 12 rotates. The pawl members 20 may be formed integrally with the inertia shifter 12 with a flexible connecting portion 22 connecting each pawl member 20 with the inertia shifter 12, or each pawl member 20 may be connected to the shifter 12 by suitable means, such as a hinge. When the latter is the case, the material for forming the shifter 12 is not limited to synthetic resious materials. The pawl members 20 may be normally placed in an opened position as by resilient means.

The upper casing member 7 is formed at its inner peripheral surface with a plurality of receiving portions 23 which are equal in number to the protuberances 17 in the illustrated embodiment and circumferentially spaced apart substantially equidistantly from each other each for receiving and engaging one of the pawl mebmers 20. The receiving portions 23 each have a substantial height ane extend vertically from the plane of FIG. 4, so that they are engageable with the pawl members 20 even if the shifter 12 moves vertically as described hereinabove. Each receiving portion 23 includes an angling surface portion 24 located at one end thereof which is posterior to an opposite end thereof with respect to the direction of rotation A for abutting against an end face of the pawl member 20 swung outwardly from the outer peripheral surface of the shifter 12, and an inclined surface portion extending circumferentially from the angling surface portion 24 for enclosing the pawl member 20 when the later is opened.

The constituent feature of the invention of the aforesaid construction performs the following function. In the event that during a mowing operation the free end portions of the cords 11 bounce back from some hard object after striking it on the centrifugal forces acting on the cords 11 are reduced in intensity due to a reduction in the number of revolutions of the casing 7, 9, the inertia shifter 12 would oscillate between the protuberances 17 or 18. However, the rearward movement of the shifter 12 is restricted by the pawl members 20 of the shifter 12 engaging the receiving portions 23 of the casing member 7. The range of rearward movements or oscillatory movements of the shifter 12 can be set at any level as desired by the phase difference between the position in which the pawl members 20 and receiving portions 23 are formed and the position in which the projections 15 and the protuberances 17 are formed. Thus, it is possible to avoid the cords being drawn into the casing 7, 9 through the apertures 13.

In the embodiment shown and described hereinabove, the pawl members 20 and receiving portions 23 have been shown and described as being formed in the shifter 12 and casing member 7, respectively. However, the invention is not limited to this specific form of embodiment, and similar effects can be achieved by forming the pawl members 20, which are normally moved to an open position as by springs, in the casing member 7 and the receiving portions 23 in the shifter 12 in such a manner that the pawl members 20 and receiving portions 23 are oriented in a direction opposite the direction in which they are oriented in the embodiment shown and described hereinabove. The receiving portions 23 may be formed at the lower casing member 9, in place of the upper casing member 7.

What is claimed is:

1. A cutter blade device of a mowing machine comprising:
    a rotary casing;
    at least one flexible cord held in the rotary casing in coiled form; and
    an inertia shifter formed with an aperature for drawing a free end portion of the cords therethrough from the rotary casing to outside, said inertia shifter being arranged in the rotary casing for sliding movement both axially and peripherally of the rotary casing and capable of being brought into and out of locking engagement with the rotary casing in a position anterior to the shifter with respect to the direction of rotation of the rotary casing; wherein the improvement comprises:
    at least one pawl member provided to one of the inertia shifter and rotary casing and operable in a direction opposite the direction of rotation of the rotary casing; and
    at least one receiving portion provided to the other of the inertia shifter and rotary casing and operative to come into engagement with the pawl member.

* * * * *